Dec. 16, 1924. Re. 15,964

L. S. CHADWICK

ADJUSTABLE SUPPORT FOR BURNERS AND THE LIKE

Original Filed Dec. 5, 1921 2 Sheets-Sheet 1

Inventor
Lee S. Chadwick
By Hull, Brock & West
Attys.

Dec. 16, 1924.

L. S. CHADWICK

Re. 15,964

ADJUSTABLE SUPPORT FOR BURNERS AND THE LIKE

Original Filed Dec. 5, 1921 2 Sheets-Sheet 2

Inventor
Lee S. Chadwick

By Hull, Brock & Wash
Attys.

Reissued Dec. 16, 1924. Re. 15,964

UNITED STATES PATENT OFFICE.

LEE S. CHADWICK, OF SHAKER HEIGHTS, OHIO, ASSIGNOR TO THE CLEVELAND METAL PRODUCTS COMPANY, OF CLEVELAND, OHIO, A CORPORATION OF OHIO.

ADJUSTABLE SUPPORT FOR BURNERS AND THE LIKE.

Original No. 1,441,660, dated January 9, 1923, Serial No. 520,002, filed December 5, 1921. Application for reissue filed October 29, 1923. Serial No. 671,611.

*To all whom it may concern:*

Be it known that I, LEE S. CHADWICK, a citizen of the United States, residing at Shaker Heights, in the county of Cuyahoga and State of Ohio, have invented certain new and useful Improvements in Adjustable Supports for Burners and the like, of which the following is a full, clear, and exact description, reference being had to the accompanying drawings.

This invention relates to improvements in oil stoves and has to do more particularly with means for supporting the burners.

The objects of the invention are to provide supporting means for oil burners that is very simple of construction and is economical of manufacture and by which the burner may be readily adjusted to align it with the burner opening in a stove stop, the adjustment being particularly simple, both as to construction and manipulation, and very effective in holding the burner in its properly adjusted position against accidental disarrangement. A further object of the invention is to provide a unique form of clamp which, besides constituting a part of the burner supporting means, serves to bind the inlet fitting of the burner to the fuel supply pipe.

Figure 1:
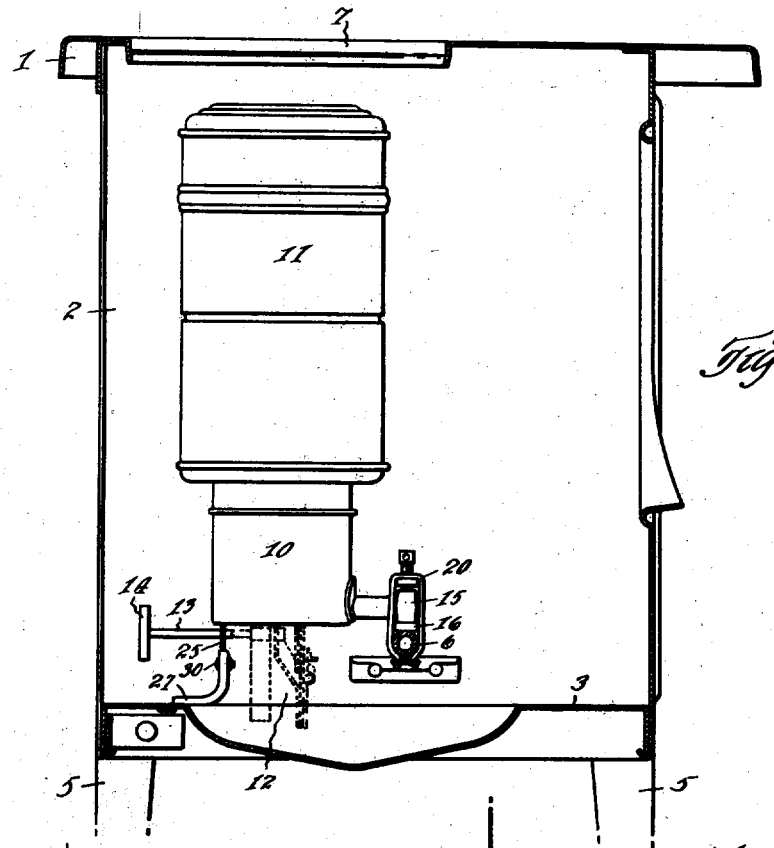
Figure 2:
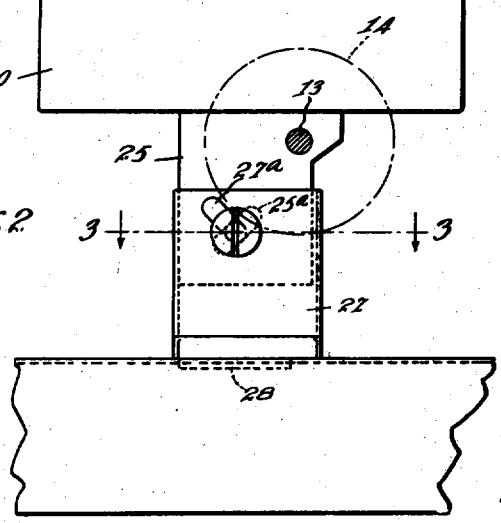
Figure 3:
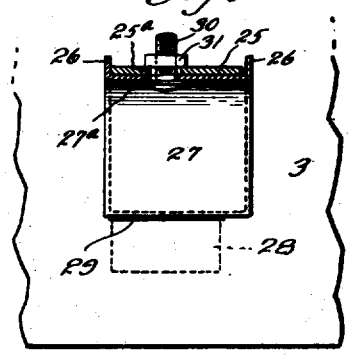
Figure 4:
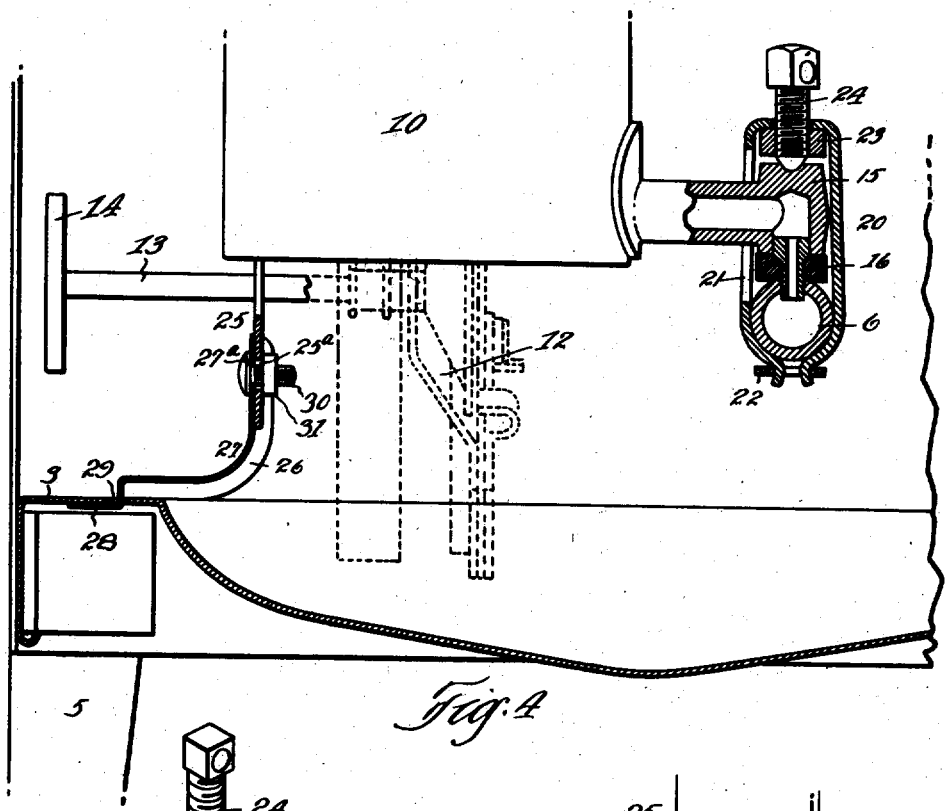
Figure 6:
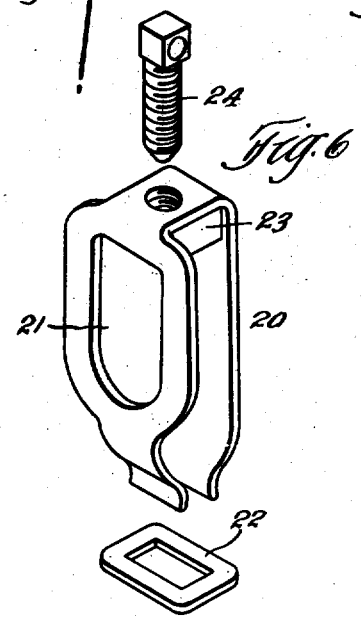
Figure 5:
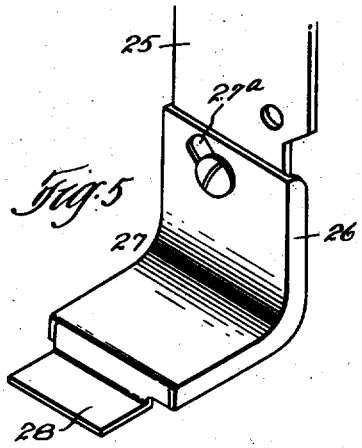

The foregoing objects, and others which will become apparent from the following description, are attained in the embodiment of the invention illustrated in the drawings accompanying and forming a part hereof and wherein Fig. 1 is a section through an oil stove showing a burner supported therein in accordance with my invention; Fig. 2 is a fragmentary front elevation of the burner with the hand wheel of the wick raising spindle omitted to more clearly show the adjustable leg of the supporting means, the present view and those following being on a somewhat larger scale than Fig. 1; Fig. 3 is a horizontal section through the adjustable leg of the supporting means, the view being taken on the line 3—3 of Fig. 2; Fig. 4 is a vertical section from front to rear through the burner supporting means, the adjacent parts of the burner structure being shown in general outline; Fig. 5 is a perspective view of the adjustable leg; and Fig. 6 is a similar view of the clamp, the parts whereof are in separated condition.

As is well known to those familiar with the oil stove art, it has been the usual practice heretofore to support the burners of oil stoves of the character to which the present invention pertains solely from the fuel supply pipe directly above which the burners were mounted. With some forms of burners, as with that type wherewith I have elected to show my present invention associated, it is impractical to locate the burner directly over the supply pipe because of the fact that certain mechanism associated with the wick raising means is located below the burner. Therefore, my present invention is peculiarly adapted for use with burners of this type.

Referring now to the construction illustrated in the drawings 1 is a stove top, sustained by end panels 2 a given distance above the base 3, and the whole is supported a suitable distance from the floor by legs 5. A fuel supply pipe 6 extends endwise of the stove above the base and is supported by the end panels 2; and the top 1 is provided with burner openings 7. This construction is quite in accordance with prevailing practice and therefore a more detailed description of the general stove structure is deemed unnecessary.

The burner proper is designated 10 and it is surmounted by a drum 11 which should be located substantially in axial alignment with the burner opening 7. The burner 10 is of the well known tubular type which, it may be explained generally, comprises inner and outer wick tubes that are joined at their lower ends to enclose therebetween an annular space within which a wick is adapted to be raised and lowered by suitable mechanism, in the present instance such mechanism being shown in a general way at 12 and incorporating the spindle 13 that is equipped at its outer end with a hand wheel 14. The space between the wick tubes is supplied with oil through an elbow fitting 15 that projects rearwardly from the lower portion of the burner 10. This fitting is secured with a leak-proof joint to a seat 16 of the supply pipe 6 by means of my improved clamp 20.

This clamp, as will be seen more clearly from Fig. 6, comprises an inverted substantially U-shaped member, the forward branch of which (considering it in the position it occupies in a stove) is provided with a slot 21 for the passage of the elbow fitting 15, and at their lower ends the opposed branches are brought together beneath the supply pipe 6 and inserted through a loop 22 beyond which the ends of the branches are flared outwardly. Confined against turning between the upper ends of the opposed branches is a nut 23 through which a set screw 24 is threaded, said set screw passing through an aperture in the central portion of the U-shaped member and bearing at its inner end in a depression formed in the upper end of the elbow fitting 15. It will be seen from this that when the set screw is turned firmly down against the elbow fitting, it will bind the elbow securely to the supply pipe and constitute a very efficient support for the rear porton of the burner.

The front portion of the burner is supported by an adjustable leg comprising a plate 25 that depends from the burner and which reposes between the side flanges 26 of the vertical branch of an angle member 27 that is of channel formation and the horizontal branch of which extends forwardly and bears at its front end on the stove base 3 where it terminates in a tongue 28 that is engaged through a slot 29 in the stove base. The overlying portions of the plate 25 and the web of the member 27 have diagonal slots which register and are shown as at substantially right angles to each other, the respective slots of the plates 25 and member 27 being designated $25^a$ and $27^a$. A bolt 30 extends through these slots and has a nut 31 applied to it rearwardly of the plate 25.

It will be readily understood from the nature of the construction above described that the burner is capable of being swung to a limited extent on the supply pipe 6 as a fulcrum. By virtue of the adjustment of the leg comprising the parts 25 and 27, the burner may be swung forwardly or rearwardly into axial alignment with the burner opening 7 of the stove top and securely held in properly adjusted position by a tightening of the bolt 30. By having the slots $25^a$ and $27^a$ inclined with respect to each other, the adjustment is held much more secure against accidental disarrangement than if the slots were in vertical alignment, for in such a case any force tending to disturb the adjustment would have to be resisted solely by the frictional engagement of the bolt head and nut with the parts clamped therebetween, whereas, under the present arrangement, a shearing strain only has to be withstood by the bolt, and this consequently and proportionally lessens the clamping responsibility of the bolt and nut.

It will be observed that the width of the plate 25 is somewhat less than the distance between the side flanges of the member 27 thereby permitting of a slight lateral adjustment of the burner, ample to take care of any irregularities of parts or inaccuracies of assembly and accordingly facilitating production.

Having thus described my invention, what I claim is:

1. In a stove structure the combination with a top having a burner opening, a base spaced a suitable distance below the top, a burner supported between the base and top in operative relation to the aforesaid opening and in a manner rendering it capable of being tilted, and an adjustable support for the burner for resisting the tilting thereof, said support comprising overlapping elements carried respectively by the burner and base and having registering reversely oblique slots, and clamping means extending through the slots for securing said elements together in any adjusted position.

2. In a stove structure, the combination of a burner, means supporting the burner from the structure in such manner as to permit a tilting of the burner, and an adjustable support for resisting the tilting of the burner and comprising overlapping elements secured respectively to the burner and stove structure, said elements having reversely oblique registering slots, and clamping means extending through said slots for binding the elements together in any adjusted position.

3. In a stove structure of the character set forth, the combination of a fuel supply pipe a burner, communicative connections between the burner and supply pipe and through which the former is supported from the latter in such manner as to be capable of tilting with respect thereto, and an adjustable support for resisting tilting of the burner, said support comprising overlapping elements connected respectively to the burner and stove structure and having reversely oblique registering slots, and clamping means extending through said slots for binding the elements together in any adjusted position.

4. In a stove structure of the character set forth, the combination of a burner, means supporting the burner in such manner as to permit of its being tilted, and an adjustable support for resisting the tilting of the burner and comprising overlapping elements secured respectively to the burner and the stove structure and having reversely oblique registering slots, and clamping means extending through the slots for binding the elements together in any adjusted position, one of said elements being of channel formation and receiving between its side flanges said other element.

5. In a stove structure of the character set forth, the combination of a base, a fuel supply pipe supported above the base, a burner, connections between the burner and supply pipe and through which the former is supported from the latter in such manner as to permit of its being tilted with respect thereto, and an adjustable support for resisting the tilting of the burner, said support comprising a plate depending from a part of the burner remote from that connected to the supply pipe, a channel member rising from the base and receiving between its side flanges the aforesaid plate, the web of said channel member and said plate having reversely oblique registering slots, and clamping means extending through said slots for connecting the channel member and said plate together in any adjusted position.

6. In a stove structure of the character set forth, the combination of a base, a fuel supply pipe supported thereabove, a burner, communicative connection between the burner and pipe and whereby the former is supported from the latter in such manner as to permit the former to be tilted with respect to the latter, a plate depending from a part of the burner remote from that having connection with the supply pipe, an angle shaped channel member having one of its branches resting upon the base and between the side flanges of the other branch whereof the aforesaid plate reposes, the latter branch and the said plate having reversely oblique registering slots, and clamping means extending through said slots for binding together said member and plate in any adjusted position, the member terminating at its forward end in a tongue and the base having a slot through which said tongue is engaged.

7. An adjustable support for objects comprising two overlapping elements, one of said elements being secured to the object, said elements having reversely oblique registering slots, and clamping means extending through said slots for holding the elements in any adjusted position with respect to each other.

8. An adjustable support for objects comprising overlapping elements one of which is secured to the object and the other of which is adapted to rest on a supporting surface, said elements having reversely oblique registering slots, and clamping means extending through the slots for binding the elements together in any adjusted position, one of said elements being of channel formation and receiving between its side flanges said other element.

9. In a stove structure, the combination of a supply pipe, a burner situated at one side thereof, an elbow fitting extending from the side of the burner and reposing upon a seat of the pipe, and a clamp for binding the elbow fitting to the supply pipe, said clamp comprising a member surrounding the elbow fitting and pipe, one branch whereof is provided with an opening through which the elbow fitting extends.

10. In a stove structure, the combination of a supply pipe, a burner situated at one side thereof, an elbow fitting extending from the side of the burner and reposing upon a seat of the pipe, and a clamp for binding the elbow fitting to the supply pipe, said clamp comprising a U-shaped element extending down over the fitting and pipe, one branch whereof is slotted for the passage of the fitting, the branches approaching each other below the pipe, a loop through which the end portions of the branches are extended and beyond which they are turned outwardly and a screw having operative connection with the central portion of the U-shaped element and bearing upon the top of the elbow fitting for placing the parts under tension and forcing the elbow fitting against the seat of the pipe.

11. A clamp for binding an elbow fitting to a pipe with the lateral branch of the fitting at right angles to the pipe, said clamp comprising a member surrounding the fitting and pipe, one branch whereof is provided with an opening through which the lateral branch of the elbow fitting extends.

12. In a stove of the character set forth, in combination with a supporting structure, a burner, means connecting the burner to said structure in such manner as to permit a tilting of the burner with respect to the structure, and an adjustable support for resisting the tilting of the burner and comprising overlapping elements fastened respectively to the burner and stove structure, and means for clamping said elements together in various adjusted positions.

13. In a stove of the character set forth, the combination of a supporting structure, a burner, means connecting the burner to said structure in such manner as to permit of its being tilted with respect to the structure, and adjustable means for resisting the tilting of the burner comprising overlapping elements fastened respectively to the burner and said structure and having registering openings, and clamping means extending through said openings for binding the elements together in any adjusted position.

14. In a stove of the character set forth, the combination of a supporting structure, a burner, means connecting the burner to said structure in such manner as to permit of its being tilted with respect to the structure, and adjustable means for resisting the tilting of the burner comprising overlapping elements fastened respectively to the burner and said structure and having registering openings, and clamping means extending through said openings for binding the elements together in any adjusted position, one of said elements being of channel formation and receiving between its side flanges the other element.

15. In a stove of the character set forth, the combination of a frame structure, a liquid fuel supply pipe supported thereby, a burner, means connecting the burner and supply pipe and through which communication is established between the two, said means permitting the burner to yield with respect to the supply pipe, and an adjustable connection between the burner and the frame structure whereby the burner may be adjusted with respect to the structure about a center substantially coincident with the axis of the pipe.

16. In a stove of the character set forth, the combination of a frame structure, a burner, means yieldingly supporting the burner from the structure, and an adjustable connection between the burner and the frame structure comprising overlapping elements that are fastened to the burner and structure, respectively, and means for clamping said elements together in various adjusted positions.

17. In a stove of the character set forth, the combination of a frame structure, a liquid fuel supply conduit supported thereby, a burner, means connecting the burner and conduit and through which fuel is conducted from the conduit to the burner, and an adjustable connection between the burner and the frame structure.

18. In a stove of the character set forth, the combination of a frame structure, a liquid fuel supply conduit supported thereby, a burner, means connecting one side of the burner to the conduit and through which fuel is conducted from the conduit to the burner, and an adjustable connection between the opposite side of the burner and the frame structure.

19. In a stove of the character set forth, the combination of a frame structure, a burner, means yieldingly supporting the burner from the structure, and an adjustable connection between the burner and the structure which serves to hold the burner substantially rigid in any position to which it may be adjusted.

In testimony whereof I hereunto affix my signature.

LEE S. CHADWICK.